United States Patent [19]
Minagawa et al.

[11] 4,321,191
[45] Mar. 23, 1982

[54] STABILIZED COMPOSITION COMPRISING A DIHYDRIC ALCOHOL THIODIPROPIONIC ACID ESTER

[75] Inventors: Motonobu Minagawa, Koshigawa; Yutaka Nakahara, Iwatsuki; Tohru Haruna, Okegawa, all of Japan

[73] Assignee: Argus Chemical Corp., Brooklyn, N.Y.

[21] Appl. No.: 83,791

[22] Filed: Oct. 11, 1979

Related U.S. Application Data

[63] Continuation of Ser. No. 884,559, Mar. 8, 1978, abandoned.

[51] Int. Cl.$^3$ .................. C08K 5/36; C08K 5/13; C08K 5/11; C08K 5/04
[52] U.S. Cl. .................. 524/285; 252/406; 524/303; 524/304
[58] Field of Search .............. 260/463, 45.85 S, 45.95, 260/45.7 R; 252/406

[56] References Cited

U.S. PATENT DOCUMENTS

3,564,076  2/1971  Kauder .................. 260/45.85
3,737,486  6/1973  Schutze et al. .......... 260/45.95 D

*Primary Examiner*—V. P. Hoke
*Attorney, Agent, or Firm*—Otto S. Kauder

[57] ABSTRACT

Stabilizer compositions are provided to increase the resistance of a synthetic resin to deterioration upon heating, comprising in combination (A) a thiodipropionic acid ester of a dihydric alcohol having 2 to 20 carbon atoms and an alcohol or carboxylic acid chain terminator having 1 to 21 carbon atoms, and (B) a 700 to about 10,000 molecular weight ester of a polyhydric phenol with carbonic acid or with carbonic acid and another acid which can be an aliphatic dicarboxylic acid, phosphorous acid, phosphoric acid, boric acid, or an organophosphonic acid.

Synthetic resins that can be stabilized with composition of the invention include polymers of alpha-olefins having 2 to 6 carbon atoms, vinyl chloride polymers, acrylonitrile-butadiene-styrene polymers, and terephthalic acid ester polymers.

13 Claims, No Drawings

STABILIZED COMPOSITION COMPRISING A DIHYDRIC ALCOHOL THIODIPROPIONIC ACID ESTER

This is a continuation of application Ser. No. 884,559, filed Mar. 8, 1978, now abandoned.

BACKGROUND OF THE INVENTION

This invention relates to new stabilizer combinations, and to synthetic resin compositions, particularly olefin polymer, acrylic polymer, vinyl halide polymer, and terephthalic acid ester polymer compositions containing the same, and having as a result an increased resistance to deterioration in color and mechanical properties when heated to elevated temperatures of the order of 150° C. and higher.

The pioneer disclosure of thioether carboxylic acid esters for stabilizing a polymer is believed to be by M. Gribbins in U.S. Pat. No. 2,519,755 of Aug. 22, 1950. Gribbins stabilized ethylene polymers with 0.001% to 5% by weight of a beta-thioether of an ester of propionic acid having the formula:

$$ROOCCH_2CH_2S-X,$$

in which R is an alkyl or a cycloalkyl radical such as n- and isobutyl, amyl, heptyl, nonyl, decyl, lauryl, glycyl, cinnamyl, capryl, benzyl, allyl, cetyl, stearyl, palmityl, cyclohexyl, and similar groups, and X is:

1. A hydrocarbon group such as, e.g., the alkyl groups: methyl, ethyl, propyl, butyl, lauryl; and aryl groups: phenyl, napthyl, benzyl, and such groups as p-methoxy phenyl, p-hydroxyphenyl and cyclohexyl.
2. An oxygenated-hydrocarbon group such as, e.g. the alcohol groups: hydroxymethylene, hydroxyethylene, and hydroxybutylene; the ether groups: methoxymethylene, methoxyethylene and ethoxyethylene; and acid groups and the R esters thereof: carboxymethylene, carboxyethylene, carboxypropylene and carboxybutylene; and aldehyde radicals as aldehydoethyl.
3. A sulfur-hydrocarbon group such as, e.g., mercaptoethyl, mercaptopropyl, mercaptobutyl, mercaptoisobutyl, mercaptohexyl and ethiaethyl.
4. A sulfur-and oxygenated-hydrocarbon group such as, e.g., carboxyethiaethyl $(CH_2CH_2SCH_2CH_2COOH)_2$ carboxyethiaethyldithiaethyl $(CH_2CH_2SSCH_2CH_2SCH_2CH_2COOH)$, carboxyethiaisobutyl $(CH_2CH_2CH(CH_3)SCH_2CH_2COOH)$ and carboxyethiapropyl $(CH_2CH_2CH_2SCH_2CH_2COOH)$.
5. A sulfur- and nitrogen-containing hydrocarbon group such as, e.g., 3-benzothiazyl mercaptopropionic acid, specifically described in U.S. Pat. No. 2,397,960.

Among these, Gribbins found the di-higher alkyl beta-thiodipropionates and especially the dilauryl and distearyl esters outstanding. Subsequently, thioether carboxylic acid esters and in particular thiodipropionates have been employed in conjunction with other stabilizers such as a polyhydric phenol in the stabilization of polypropylene and other polyolefins against degradation upon heating and ageing under atmospheric conditions. Disclosures by C. Tholstrup, U.S. Pat. Nos. 3,033,814 of May 8, 1962 and 3,160,680 of Dec. 8, 1964; L. Rayner, U.S. Pat. No. 3,181,971 of May 4, 1965; D. Bown, U.S. Pat. No. 3,242,135 of 1966; H. Hagemeyer, U. S. Pat. No. 3,282,890 of Nov. 1, 1966; J. Casey, U.S. Pat. Nos. 3,496,128 of Feb. 17, 1970 and 3,586,657 of June 22, 1971; M. Minagawa, U.S. Pat. Nos. 3,549,572 of Dec. 22, 1970, 3,629,189 of Dec. 21, 1971, 3,673,152 of June 27, 1972, 3,849,370 of Nov. 19, 1974 and 3,869,423 of Mar. 4, 1975; W. Drake U.S. Pat. No. 3,624,026 of Nov. 30, 1971; A. DiBattlsta, U.S. Pat. No. 3,824,192 of July 16, 1974; B. Cook, U.S. Pat. No. 3,850,877 of H. Mueller U.S. Pat. No. 3,850,918 of Nov. 26, 1974; M. Dexter U.S. Pat. Nos. 3,856,748 of Dec. 24, 1974, 3,888,824 of June 10, 1975, and 3,903,160 of Sept. 2, 1975; P. Klemchuk U.S. Pat. No. 3,860,558 of Jan. 14, 1975; M. Rasberger U.S. Pat. Nos. 3,867,340 of Feb. 18, and 3,901,931 of Aug. 26, 1975; H. Brunetti U.S. Pat. Nos. 3,867,337 of Feb. 18 and 3,873,498 of Mar. 25, 1975; S. Rosenberger U.S. Pat. Nos. 3,884,874 of May 20 and 3,887,518 of June 3, 1975; C. Ramey U.S. Pat. No. 3,907,803 of Sept. 23, 1975 are representative of a very large number of stabilizer combinations including dilauryl and distearyl thiodipropionate or other dialkyl thiodipropionates along with polyhydricphenols and sometimes organic phosphites, metallic stearates, ultraviolet absorbers, nickel compounds, and heavy metal deactivators for use in polypropylene and other polyolefins.

While dialkylthiodipropionates have many favorable attributes such as availability in high purity at reasonable cost, a low degree of toxicity, and generally good stabilizing effectiveness, certain problems attendant on their use have long been recognized, particularly the need to use high concentrations in certain highly stressed formulations to obtain the required heat stability, and a tendency to lose effectiveness in use as a result of exposure to the leaching action of moving streams of warm water and warm air as in the washing and drying cycles of automatic dishwashers and laundry machines.

Attempts to improve on these characteristics have included the use of more efficient and more permanent thiodipropionate esters as well as more effective antioxidants and stabilizer combinations. Thus A. Hecker in U.S. Pat. No. 3,244,650 of Apr. 5, 1966 disclosed a stabilizer system for polypropylene composed of three stabilizers: an organic polyhydric phenol, an organic phosphite and a polyvalent metal salt of an organic acid. To this system, U.S. Pat. No. 3,255,136 of June 7, 1966 added a fourth ingredient, a thiodipropionic acid ester having the formula:

$$R_1OOCH_2CH_2-S-CH_2CH_2COOY$$

in which $R_1$ is an organic radical selected from the group consisting of hydrocarbon radicals such as alkyl, alkenyl, aryl, cycloalkyl and mixed alkyl aryl and mixed alkyl cycloalkyl radicals; hydroxyalkyl and hydroxyalkyloxyalkylene radicals; and esters thereof with aliphatic carboxylic acids; and Y is selected from the group consisting of (a) hydrogen, (b) a second R radical $R_2$, which can be the same as or different from the $R_1$ radical, (c) a polymeric chain of n thiodipropionic acid ester units:

$$-XO(OCCH_2CH_2SCH_2CH_2COOXO)_nOCCH_2CH_2-S-CH_2CH_2COOZ$$

where Z is hydrogen, $R_2$ or M, n is the number of thiodipropionic acid ester units in the chain, and X is a bivalent hydrocarbon group of the type of $R_1$, that is, alkylene, alkenylene, cycloalkylene, mixed alkylene-arylene and mixed alkylene-cycloalkylene radicals: hydroxyalkylene and hydroxyalkyloxyalkylene radicals;

and esters thereof with aliphatic carboxylic acids; and (d) a polyvalent metal M of Group II of the periodic table such as zinc, calcium, cadmium, barium, magnesium and strontium.

The molecular weights of the R and Y radicals are taken such that with the remainder of the molecule the thiodipropionic ester has a total of from about ten to about sixty atoms per sulfur atom.

U.S. Pat. No. 3,378,516, patented Apr. 16, 1968 to Tholstrup, Bell and Kibler, proposes combinations including linear thiodialkanoate polyesters obtained from a thiodialkanoic acid and a diol having a molecular weight of from about 500 to 4000, together with a phenolic antioxidant and/or a phosphite. These combinations are said to display synergistic stabilizing effectiveness.

H. Schirmer in U.S. Pat. No. 3,598,776 of Aug. 10, 1971, disclosed that the incorporation of 10% by weight disproportionated resin in polypropylene enabled him to use 2% by weight dilaurylthiodipropionate (LTP) in the polymer without blooming while in the absence of the rosin only 1% could be used without blooming and the stability of the polymer with the rosin at the higher LTP concentration was significantly increased.

H. Schutze in U.S. Pat. No. 3,630,991 of Dec. 28, 1971 disclosed non-exuding and non-volatile sulfur containing esters of cyclic terpene alcohols for the stabilization of 2 to 8 carbon alpha-olefin polymers together with hindered phenols. Schutze's esters may be represented by the structural formulae:

ROOC CH$_2$(CH)$_n$SR$_a$
ROOC CH$_2$(CH$_2$)$_n$SS(CH$_2$)$_n$CH$_2$COOR'
ROOCCH$_2$(CH$_2$)$_n$ $\overset{O}{\underset{\|}{S}}$ (CH$_2$)$_n$CH$_2$COOR'
ROOC CH$_2$(CH$_2$)$_n$S(CH$_2$)$_n$S(CH$_2$)$_n$CH$_2$COOR'
ROOC CH$_2$(CH$_2$)$_n$S(CH$_2$)$_n$S(CH$_2$)$_m$CH$_3$ where
R$_a$ is —CH$_2$(CH$_2$)$_n$COOR' or alkyl
n=1 to 5
m=1 to 16
R is a radical selected from the group consisting of abietyl, hydroabietyl, tetrahydroabietyl, dihydroabietyl, de hydroabietyl, dihydropimaryl, tetrahydropimaryl, borneyl, alpha-terpineyl, B-terpineyl, V-terpineyl, methyl, and dihydroterpineyl, and R' is a radical selected from the group consisting of abietyl, hydroabietyl, tetrahydroabietyl, dihydroabietyl, dehydroabietyl, dihydropimaryl, tetrahydropimaryl, borneyl, alpha-terpineyl, B-terpineyl, methyl, and dihydroterpineyl.

A. Onishi, in U.S. Pat. No. 3,629,194 of Dec. 21, 1971 disclosed a polyolefin resin stabilized against thermal aging with esters of alkyl thiopropionic or alkyl thiobutylric acid with a polyol having up to five hydroxyl groups, in combination (optionally) with a phenolic antioxidant. The alkyl thiopropionic or alkyl thiobutyric acid esters are defined as having one of the formula:

R—SC$_n$H$_{2n}$COOR'OOCC$_n$H$_{2n}$SR (1)
RSC$_n$H$_{2n}$COOC$_m$H$_{2m}$OOCC$_n$H$_{2n}$SR (2)
R"C$+$CH$_2$OX)$_3$ (3)
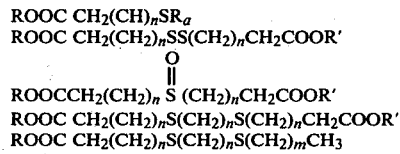 (4)

and

C(CH$_2$OX)$_4$ (5)

wherein
R is an alkyl of 8 to 30 carbon atoms
m and n are each integers of 2 or 3
R' is an alkylene containing 2 to 12 carbon atoms
R" is an alkyl containing 1 to 20 carbon atoms
X is hydrogen or —OC—C$_n$H$_{2n}$SR, at least one of which is —OCC$_n$H$_{2n}$SR
the R$_1$, R' and R" moieties in one compound being the same or different.

The phenolic antioxidants are defined by Onishi as mono- or polyhydric phenolic compounds in which at least one of the ortho positions to a hydroxyl group is substituted by an alkyl, aralkyl, or cycloalkyl group.

The substituents preferably contain carbon atoms of a number of the order of 3 to 10, and the alkyl group, inclusive of that in an aralkyl and cycloalkyl groups can be unsaturated. The phenolic compound may be further substituted, and the phenolic compounds may be polyphenolic compounds such as bisphenolic, trisphenolic, or tetrakisphenolic compounds in which phenolic nuclei are connected by the connecting group such as an alkylene, a thioether, or a triazinoxyl group.

M. Dexter in U.S. Pat. No. 3,758,549 of Sept. 11, 1973 disclosed alkyl esters derived from alkyl thioalkanoic acids and alkane polyols, such as pentaerythritol tetrakis, 3-n-dodecylthiopropionate, and ethylene-bis-3-n-dodecylthiopropionate. These are used in combination with phenolic antioxidants to effectively stabilize polyolefins from the deleterious effects of heat and oxygen. The alkyl esters are defined by the formula:

$$(R-S-CH_2CH_2\overset{O}{\underset{\|}{C}}O)_nZ$$

wherein
R is an alkyl group of from one to eighteen carbon atoms
n has a value of from 2 to 4; and
Z is an aliphatic hydrocarbon of the formula:

C$_y$H$_{2y+2-n}$ in which y has a value of from 2 to 18 when n is 2 and a value of from 3 to 6 when n is greater than 2, and the value of y in all cases being equal to or greater than that of n.

M. Minagawa in Japanese Kokai 75/106881 of Aug. 27, 1975 disclosed stabilized resin compositions containing 3-alkylthiopropionate esters of alcohols containing a nitrogen-heterocyclic ring, for example tris(2-hydroxyethyl isocyanurate) and optionally a phenolic antioxidant.

E. Schurdak in U.S. Pat. No. 3,966,675 of June 29, 1976 has disclosed mixtures of pentaerythritol tetrakis (3-n-dodecylthiopropionate) with bis(4-t-butyl-3-hydroxy-2,6-dimethylbenzyl) dithiolterephthalate of 1,3,5-tris(4-t-butyl-3-hydroxy-2,6-dimethylbenzyl)-s-triazine-2,4,6-trione that are stated to be extremely effective in inhibiting the thermal degradation of polypropylene, and n is an integer of at least 1. n can be 2,3,4,5,6,7,8,10,50,100 or even more.

D. Bown et al in U.S. Pat. Nos. 3,510,507 of May 5, 1970 and 3,691,132 of Sept. 12, 1972 disclosed polyolefins stabilized with polyphosphites, polyphosphates, polyphosphonites, polyphosphonates, polyborates, polycarbonates, and polysilanes which are condensation products of a 4,4'-disphenol with a condensing or linking agent which may be of the ester type, such as the esters of triaryl or mixed aryl-alkyl compounds, or the acid halide type. Bown's condensation product stabilizers have molecular weights between 600 and 8000 or higher and are described by the structural formula:

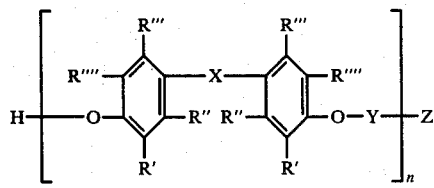

where X is selected from the group consisting of

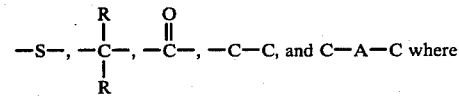

A is a $C_1$ to $C_{16}$ alkylene or an arylene; R', R", R''', and R'''' are selected from the group consisting of hydrogen, $C_1$ to $C_{18}$ alkyls, and an aryl group; Y is selected from the group of

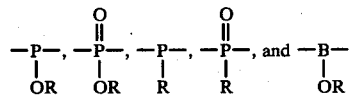

where R is hydrogen, a $C_1$ to $C_{18}$ alkyl, or aryl;

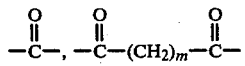

where m is 0 to 10, preferably 4 to 8,

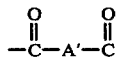

where A' is $(CH_2)_n$—S—$(CH_2)_n$ or —$(CH_2)_n$—S—$(CH_2)_m$ S—$(CH_2)_n$ where n is 0 to 10, preferably 2 and m is 0 to 10, preferably 5:

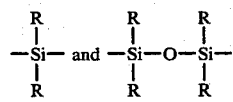

where R is an alkyl, preferably methyl, and Z is

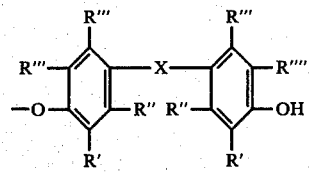

where R', R", R''', R'''', and X correspond respectively to the R', R", R''', R'''', and X previously selected when n has a value from 1 to 15, or Z may be derived from the compound used to introduce X into the product when n has a value from 2 to 15, for example —R or —OR where R is hydrogen, an alkyl, or aryl. When Y in the formula of Bown's stabilizer is

the stabilizer a hydroxyaryl phosphite. Similarly, when Y in the formula is

the stabilizer is a hydroxyaryl carbonate.

Bown's condensation products are described as especially effective in high molecular weight solid polyolefins when used together with a dialkyl sulfide costabilizer such as dilauryl thiodipropionate, distearyl thiodipropionate, ditridecyl thiodipropionate, dicetyl sulfide, bis(tetradecylmercapto) paraxylylene, and 10,24-dithiotetracontane.

J. Floyd et al in U.S. Pat. No. 4,032,510 of June 28, 1977 disclosed low molecular weight polycarbonate esters of bisphenols such as 2,2-bis(3-t-butyl-4-hydroxyphenylpropane) and 4,4'-butylidene bis(6-t-butyl-3-methylphenol) prepared in such a way as to contain few or no free phenolic hydroxyl groups as being highly effective heat and light stabilizers for polyolefins and giving a synergistic effect with distearyl thiodipropionate, tris (nonylphenyl) phosphite, and distearyl pentaerythritoldiphosphite.

SUMMARY OF THE INVENTION

In accordance with this invention, a stabilizer composition capable of increasing the resistance of a synthetic resin to deterioration upon heating comprises in combination (A) at least one thiodipropionic acid ester of a dihydric alcohol having 2 to 20 carbon atoms and a chain terminator linked to an ester group selected from the group consisting of hydroxyhydrocarbons and carboxylic acids having 1 to 20 carbon atoms, and (B) at least one 700 to 10,000 molecular weight carbonate ester of a polyhydric phenol having the formula:

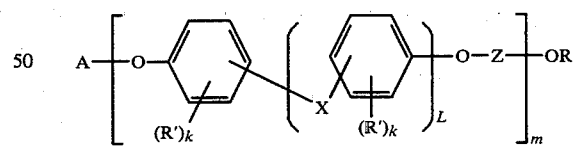

in which independently at each occurrence R' is selected from the group consisting of alkyl, cycloalkyl and arylalkyl radicals. A is selected from the group consisting of hydrogen and —Z—O—R; R is selected from the group consisting of alkyl, aryl, alkaryl, aralkyl, cycloalkyl and

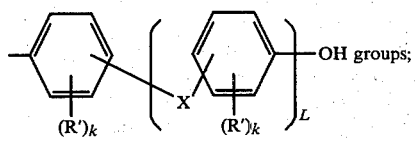

OH groups;

X is selected from the group consisting of —S—,

—CH₂SCH₂——O—, a single bond, a divalent hydrocarbon radical, and

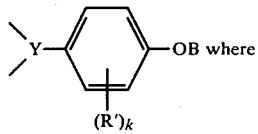

Y is a trivalent hydrocarbon radical, B is a hydrogen atom or the group

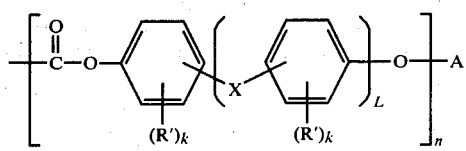

Z independently at each occurrence is selected from the group consisting of

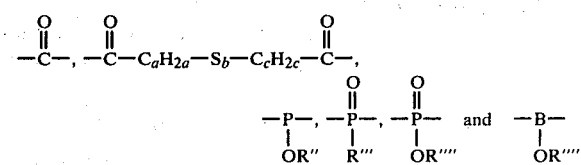

wherein R″ is R″″ or hydrogen, R″″ is alkyl having 1 to 18 carbon atoms, cycloalkyl having 5 to 12 carbon atoms, phenyl, or aralkyl and alkaryl having 7 to 24 carbon atoms; and R‴ is R″″ or alkylhydroxyphenylalkylene having 1 to 2 carbon atoms in the alkylene group, provided that at least one occurrence of Z is

a and c are integers from 1 to 7, provided that the sum of a and c is not more than 8; b is 0 or 1, k is an integer from 0 to 3, L is 0 or 1, m is 1 to about 20, and n is an average of 0.1 to about 20.

Quite small amounts of the stabilizer composition are effective in increasing resistance to deterioration. The amount of each ingredient of the stabilizer composition required can be as little as 0.01% by weight of the resin and up to about 5% by weight; larger amounts can be used but tend to be unnecessary and wasteful. The amount of stabilizer composition to be used ranges from 0.02% to about 10% by weight of the resin, preferably from 0.05% to 5% by weight. The weight ratio of the dihydric alcohol thiodipropionic acid ester to the carbonate ester in the stabilizer composition of this invention can range from about 20 to 1 to about 1 to 20.

In addition to increasing the resistance to deterioration on heating, the stabilizer compositions of this invention impart to resin compositions in which they are used excellent resistance to the impairment of physical properties resulting from the leaching of stabilizers by aqueous solutions in contact with the stabilized resin compositions.

DESCRIPTION OF THE PREFERRED EMBODIMENTS

The dihydric alcohol thiodipropionic acid esters used according to this invention have a very low vapor pressure at the polymer processing temperature, so that they are not lost from the plastic during hot processing or during the useful life of the finished article. They are substantially non-volatile at the process temperature and compatible with the plastic at all temperatures encountered in processing and use, thus avoiding exudation.

The dihydric alcohol thiodipropionic acid esters are prepared by condensing two or more moles of thiodipropionic acid with one or more moles of dihydric alcohol and if desired with a chain terminator acid or alcohol different from thiodipropionic acid and the dihydric alcohol used. In the absence of a different chain terminator acid or alcohol, excess of thiodipropionic acid or of dihydric alcohol functions as chain terminator to keep the molecular weight of the dihydric alcohol thiodipropionic acid ester in a desirable range of 380 to about 9000.

Dihydric alcohols that can be used include, for example ethylene glycol, propylene, glycol, diethylene glycol, 2,2′-thiodiethanol, triethylene glycol, 1,4-butanediol, 1,6-hexanediol, 1,10-decanediol, 1,12-octadecanediol, 2,2-diethylpropane-1,3-diol, glycerol monodecanoate, and cyclohexane-1,4-di-methanol.

The dihydric alchol ester of thiodipropionic acid used according to this invention can be represented by Formula I, as follows:

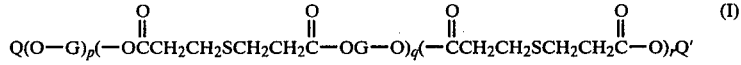

in which Q and Q′ are independently selected from the group consisting of hydrogen, alkyl having 1 to 21 carbon atoms, acyl having 1 to 21 carbon atoms, and alkylthioalkylenecarbonyl having 1 to 18 carbon atoms in the alkyl group and 1 to 2 carbon atoms in the alkylene group; G is a residue of an open chain or cyclic dihydric alcohol having 2 to 20 carbon atoms, and is a bivalent hydrocarbon group, a bivalent oxahydrocarbon group, i.e. a hydrocarbon interrupted by oxygen atoms, or a bivalent thiahydrocarbon group, i.e. a hydrocarbon group interrupted by sulfur atoms; p and r are 0 or 1 and q is an integer from 1 to about 20, provided that q+r is at least 2.

When Q and Q′ are hydrogen, the esters are chain terminated with thiodipropionic acid and/or dihydric alcohol and the dihydric alcohol thidipropionate is represented by Formula II or Formula III, as follows:

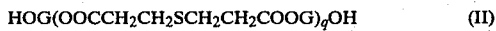

When Q or Q' is group resulting from the use of an alcohol or phenol chain terminator, p is 0 and r is 1 and the formula of the dihydric alcohol thiodipropionic acid ester is represented by IV as follows:

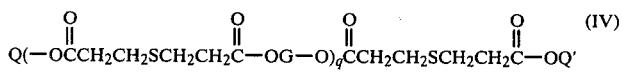

in which Q and Q' are such alkyl, alkylthioalkyl, arylalkyl, cycloalkyl, alkenyl, aryl or alkylaryl radicals as, for example, methyl, ethyl, propyl, isopropyl, butyl, isobutyl, t-butyl, amyl, isoamyl, n-octyl, isooctyl, 2-ethyl hexyl, t-octyl, decyl, dodecyl, octadecyl, allyl, hexenyl, linoleyl, ricinoleyl, oleyl, phenyl, xylyl, tolyl, ethylphenyl, naphthyl, benzyl, 2-methylcyclohexyl, 6-dihydrocyclopentadienyl, dimethylbenzyl, p-dodecyl, benzyl, methylthioethyl, 2-butylthiopropyl, and 3-n-octadecylthiopropyl.

When Q is Q' is an acyl group resulting from the use of a mono carboxylic acid chain terminator, p is 1 and r is 0 and the dihydric alcoholthiodipropionic acid ester is represented by formula V.

in which the acyl groups Q and Q' are derived from saturated and unsaturated aliphatic, cycloaliphatic or aromatic acids having 1 to 21 carbon atoms such as formic acid, acetic acid, propionic acid, acrylic acid, 2-ethylhexanoic acid, lauric acid, stearic acid, methylcyclopentanecarboxylic acid, oleic acid, 3-butylthiopropionic acid, 2-isodecyl thioacetic acid, p-t-butylbenzoic acid and dihydroabietic acid.

Representative G residues of dihydric alcohols include polymethylene radicals having 2 to 20 carbon atoms such as ethylene, 1,3-propylene, 1,4-butylene, 1,5-pentamethylene, 1,6-hexamethylene, and 1,12-dodecamethylene; alkylene radicals such as 1,2-propylene, 1,3-butylene, 2-ethylhexylene-1,3 and 9-octadecene-1, 12-diyl; alkylsubstituted alkylene radicals such as 2-methyl-2-ethyl-1, 3-propylene and 2-methyl-2-butyl-1, 3-propylene, and cycloaliphatic radicals such as 2,2,4,4-tetramethyl-1, 3-cyclobutylene and 1,3-cyclopentylene.

The carbonate ester is a carbonate of a dihydric or trihydric phenol characterized by certain preferred structural features contributing to the synergistically enhanced stabilizing effectiveness in the stabilizer composition of this invention. These features are a controlled molecular weight in a range such that the carbonate ester is low in volatility and still sufficiently mobile in the polymer being stabilized for optimum effectiveness, which corresponds to a molecular weight range from 700 to about 10,000; and in each benzenoid ring of the esterified dihydric or trihydric phenol preferably one to two alkyl, cycloalkyl, or aralkyl groups having 1 to 10 carbon atoms of which at least one is positioned ortho to a phenolic hydroxyl group which can a free hydroxyl or a carbonate ester.

The carbonate ester component of the stabilizer composition of this invention can be derived from ortho-substituted 1,3- and 1,4-dihydric phenols having one benzenoid ring such as 2,5-di-t-butyl-hydroquinone, 2,3,6-trimethylhydroquinone, 2-methylresorcinol, and 2,6-di-t-butylresorcinol, and are represented by the above formula in which L is zero.

The carbonate ester component of the stabilizer composition can also be a carbonate ester of an ortho-substituted bisphenol having two ortho-substituted phenolic groups linked directly or through a two valent hydrocarbon group such as 2,2'-methylene bis(4-methyl-6-t-butyl-phenol), 2,2'-methylene bis(4-ethyl-6-t-butylphenol), 2,2'-methylene bis(4-methyl-6-(1-methylcyclohexyl) phenol), 2,2'-n-butylidene bis(4,6-dimethylphenol), bis-1, 1-(2'-hydroxy-3'5'-dimethylphenyl)-3,5,5-trimethylhexane, 2,2'-cyclohexylidene bis(4-ethyl-6-t-butylphenol), 2,2'-isopropylbenzylidene 4'-methylene bis(2-methyl-6-t-butylphenol), 4,4'-methylene bis (2,6-di-t-butylphenol), 4,4'-isopropylidene bis(2-phenylethylphenol), 4,4'-n-butylidene bis(3-methyl-6-t-butylphenol), 4,4'-cyclohexylidene bis(2-t-butylphenol), 4,4'-cyclohexylidene bis(2-cyclohexylphenol), and 4,4'-benzylidene bis(2-t-butyl-5-methylphenol). These esters are represented by the above formula in which L is one and X is a single bond or a divalent hydrocarbon group. Furthermore, the carbonate esters that can be used in the composition of this invention can be carbonate esters of ortho-substituted bisphenols having two ortho-substituted phenolic groups linked through oxygen or sulfur, such as 4,4'-oxobis (3-methyl-6-isopropylphenol), 4,4'-thiobis(2-methyl-6-t-butylphenol), 4,4'-thiobis(3-methyl-6-t-butylphenol), 4,4'-sulfobis(3-methyl-6-t-butylphenol), bis(2-methyl-4-hydroxy-5-t-butylbenzyl) sulfide, bis(3,5-di-t-butyl-4-hydroxy benzyl) sulfide, 2,2'-thiobis(4-t-butyl-6-methylphenol), 2,2'-thiobis(4-methyl-6-t-butyl-phenol), and 2,2'-thiobis(4,6-di-t-butylphenol). These esters are represented by the above formula in which L is one and X is a linking group including oxygen or sulfur.

Carbonate ester components of the stabilizer composition can also be carbonate esters of ortho-substituted trisphenols having three ortho-substituted phenolic groups, such as 1,1,3-tris (2'-methyl-4'-hydroxy-5'-t-butylphenyl)butane, 1,3,5-tris(3',5'-di-t-butyl-4'-hydroxybenzyl)-2,4,6-trimethylbenzene, 2,2-bis(3'-t-butyl-4'-hydroxyphenyl)-4-(3",5"-di-t-butyl-4"-hydroxyphenyl)butane, and 2,2-bis(2'-methyl-5'-t-butyl-4'-hydroxyphenyl)-4-(3",5"-di-t-butyl-4"-hydroxyphenyl)butane.

These esters are represented by the above formula in which L is one and X is a linking group

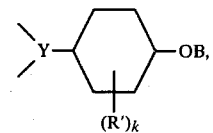

in which Y, B, R' and k are as previously defined.

In the formula of the carbonate ester used according to this invention, Z in at least one occurrence is a carbonyl group When Z is a carbonyl group

in every occurrence, the polyhydric phenol ester is exclusively a carbonate ester and can be a homopolymer when each polyhydric phenol unit is the same or a coester derived from two or more differing polyhydric phenols. In some occurrences, Z in the carbonate ester can also be a residue of an aliphatic dicarboxylic acid ester

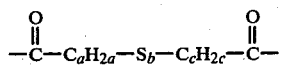

in which a and c are integers from 1 to 7 whose sum does not exceed 8 and b is 0 or 1, or a phosphorous acid ester

a phosphoric acid ester

a boric acid ester

or an organophosphonic acid ester

in which R'', R''', and R'''' are as previously defined. The molar ratio of carbonate ester Z groups to other Z groups can range from 20:0 to 1:19.

When Z the carbonate ester used according to this invention contains Z groups which are

and Z groups which are

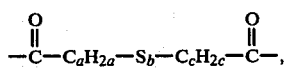

the carbonate ester is a carbonic acid and aliphatic dicarboxylic acid coester. Dicarboxylic acids that can be used include succinic acid, glutaric acid, adipic, acid, methylsuccinic acid, 3,3-dimethylglutaric acid, 2,5-dimethyladipic acid, 2,5-diethyladipic acid, pimelic acid, suberic acid, 2-ethylsuberic acid, azelaic acid, sebacic acid, thiodiacetic acid, 3,3'-thiodipropionic acid, and 3-thiahexanedioic acid.

When the carbonate ester used according to this invention contains Z groups which are

and Z groups

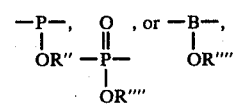

the carbonate ester is a carbonic acid and inorganic acid coester in which the inorganic acid is phosphorous acid, phosphoric acid, or boric acid, and R'' and R'''' are as previously defined. When the carbonate ester used according to this invention contains Z groups which are

and Z groups

the carbonate ester is a carbonic acid and organophosphonic acid coester in which the organophosphonic acid has linked to phosphorus three atoms of oxygen and an organic group R''' as previously defined. Suitable organophosphonic acids include methanephosphonic acid, n-butanephosphonic acid, t-butanephosphonic acid, cyclohexanephosphonic acid, p-toluenephosphonic acid, alpha-toluenephosphonic acid and 3,5-di-t-butyl-4-hydroxyphenylmethylenephosphonic acid.

The carbonate esters used in stabilizer compositions of this invention are known compounds. Useful preparative techniques can be found in the disclosures of U.S. Pat. Nos. 3,000,849; 3,028,365 and 3,510,507, as well as the review by L. Bottenbruch in "Encyclopedia of Polymer Science and Technology" (N. Bikales, ed) Volume 10, pages 714–725 (J. Wiley-Interscience Publishers, New York 1969).

Synthetic resins that can be stabilized with compositions comprising a dihydric alcohol thiodipropionic acid ester and a carbonate ester according to this invention include alphaolefin polymers having 2 to 6 carbon atoms such as polyethylene, polypropylene, polybutene, poly-3-methylbutene, poly-4-methylpentene, or copolymers thereof such as ethylene-vinylacetate copolymer, ethylenepropylene copolymer, polystyrene, polyvinylacetate, acrylic ester resins, copolymers from styrene and another monomer (for example, maleic anhydride, butadiene, acrylonitrile and so on), acrylonitrile-butadiene-styrene copolymer, acrylic acid ester-butadiene-styrene copolymer, methacrylic acid ester-butadiene-styrene copolymer, methacrylate ester resin such as polymethylacrylate, polyvinylalcohol, ethylene and butylene terephthalate polyesters, polyamide, polycarbonate, polyacetal, polyurethane, cellulosic resin, or phenolic resin, urea resin, melamine resin, epoxy resin, unsaturated polyester, silicone resin, halogen-containing resins such as polyvinyl chloride, polyvinylidene chloride, polyvinylidene fluoride and copolymers thereof, and further rubbers such as isoprene rubber chloroprene rubber, and blends of the above resins.

Stabilizer compositions comprising a dihydric alcohol thiodipropionate acid ester and a carbonate ester according to this invention can be formulated and marketed in liquid, solid, and paste forms. An inert solvent can be used to facilitate handling. The thiodipropionic acid ester and carbonate ester can also be solubilized in one another by heating, such as at 70°–160° C. for up to 4 hours, and then allowing the resulting melt to cool and harden sufficiently to be flaked and ground.

Known polymer stabilizers can be used in synthetic resin compositions together with the stabilizer compositions of this invention and can be admixed with the latter. Such known stabilizers include polyvalent metal salts of carboxylic acids, an 1,2-epoxides.

Representative polyvalent metal salts include zinc, calcium, magnesium, barium, strontium and nickel salts of monocarboxylic acids having 6 to 24 carbon atoms, for example zinc benzoate, calcium palmitate, and nickel 2-ethylbutyrate. A comprehensive disclosure of useful metal salts by M. Minagawa et al. in U.S. Pat. No. 3,869,423, column 19 line 56 to column 20 line 35 is here incorporated by reference.

Representative 1,2-epoxides include epoxysoybean oil, epoxylinseed oil, and 2-ethylhexyl epoxystearate. A comprehensive disclosure of 1,2-epoxides by M. Minagawa et al. in U.S. Pat. No. 3,869,423 column 26 line 13 to line 39 is here incorporated by reference.

The preparation of the stabilized resin composition is easily accomplished by conventional procedures. A heated two roll mill, for example, is a convenient compounding tool for blending stabilizer compositions of the invention with polyolefins, vinyl chloride polymers, ABS polymers, ethylene-vinyl acetate copolymers and others.

In the Examples that follow, each stabilizer composition of the invention includes a dihydric alcohol thiodipropionic acid ester from among those listed by name, formula and reference number S1 to S12 in Table 1, and a dihydric and trihydric phenol carbonate ester.

Esters 1 to 17 of dihydric and trihydric phenols with carbonic acid exclusively are listed in Table 2. Esters 18, 22, 26, 29, 33 and 36 whose preparations are described, and the esters in Tables 3 to 7 are coesters of dihydric and trihydric phenols with carbonic acid and an aliphatic dicarboxylic acid used in the subsequent polymer stabilization Examples. Esters 37, 42, 46, and 51 as well as the esters in Tables 8 to 11 are coesters of dihydric and trihydric phenols with carbonic acid and phosphorous acid phosphoric acid, and boric acid used in the subsequent polymer stabilization Examples. Esters 55 to 67 of dihydric and trihydric phenols with carbonic acid and an organophosphonic acid are listed in Table 12. In Tables 13 to 19 giving the results of the polymer stabilization Examples, for the sake of brevity the reference numbers from the Tables are used in place of the names of formulae of the dihydric alcohol thiodipropionic acid esters of Table 1 (referred to in column headings as "thiodipropionate compound") and the formulae of the carbonate esters from Tables 2 to 12 (referred to in column headings as "carbonate compound"). Sulfur compounds other than Table 1 thiodipropionate esters used for comparison purposes are also grouped under the heading "thiodipropionate compound" in Tables 13 to 19 and the heading "carbonate compound" in each Table groups together carbonate esters and other compounds used in place of carbonate esters for comparison purposes. The symbol "x" in the following formulas represent the tertiary butyl radical.

TABLE 1
DIHYDRIC ALCOHOL THIODIPROPIONIC ACID ESTERS

NaS - 1 n-Octadecyl 1,4-cyclohexanedimethylene thiodipropionate

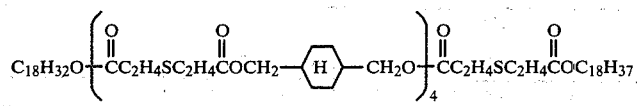

NaS - 2 2,2-Dimethylpropyl 2,2-dimethylpropylene thiodipropionate
(approximate molecular weight 800)

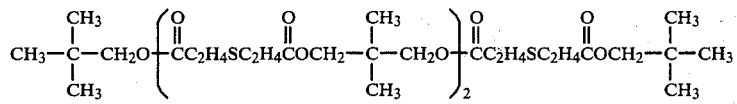

NaS - 3 2,2-Dimethylpropyl 2,2-dimethylpropylene thiodipropionate
(approximate molecular weight 1500)

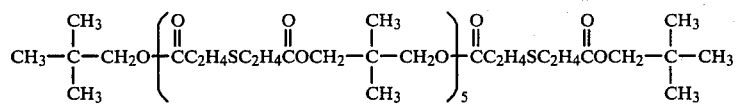

NaS - 4 n-Butyl 1,2-ethylene thiodipropionate

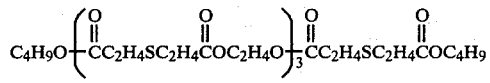

NaS - 5 n-Dodecyl 2,2'-thiodiethylene thiodipropionate

TABLE 1-continued
DIHYDRIC ALCOHOL THIODIPROPIONIC ACID ESTERS

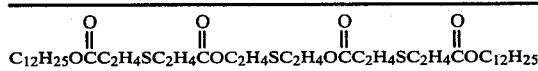

NaS - 6 Benzyl 1,6-hexamethylene thiodipropionate

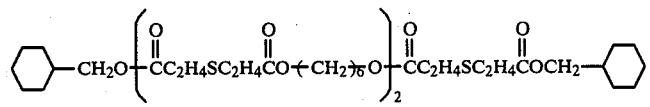

NaS - 7 2-Ethylhexyl 1,4-tetramethylene thiodipropionate

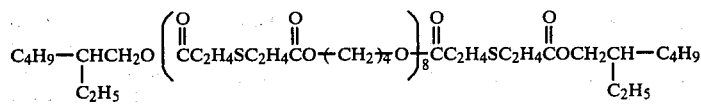

NaS - 8 2,2'-Oxydiethylene thiodipropionate-octanoate

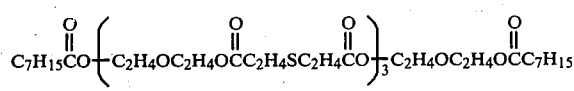

NaS - 9 1,2-Propylene thiodipropionate-dodecanoate

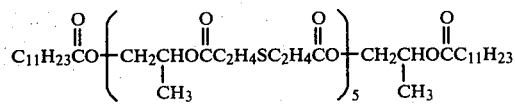

NaS - 10 1,10-Decamethylene thiodipropionate-acetate

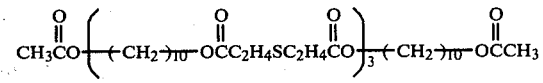

NaS - 11 1,10-Decamethylene thiodipropionate-3-dodecylthio-propionate

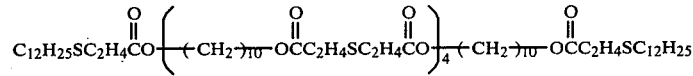

NaS - 12 1,4-Tetramethylene thiodipropionate-3-butylthio-propionate

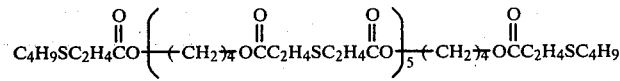

TABLE 2
CARBONATE ESTERS OF DIHYDRIC AND TRIHYDRIC PHENOLS

Na 1

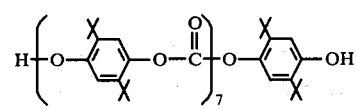

Na 2

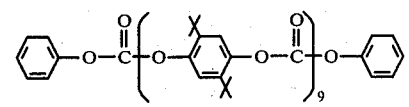

Na 3

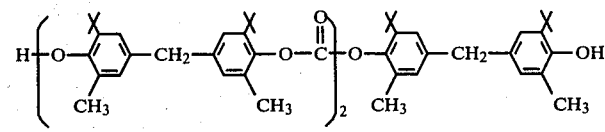

Na 4

TABLE 2-continued
CARBONATE ESTERS OF DIHYDRIC AND TRIHYDRIC PHENOLS
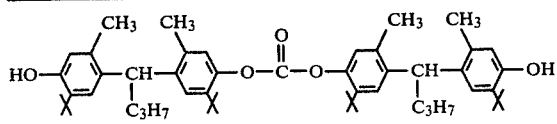
Na 5
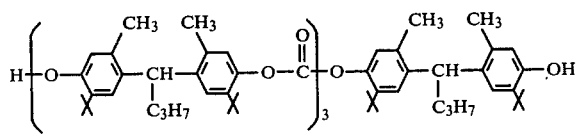
Na 6
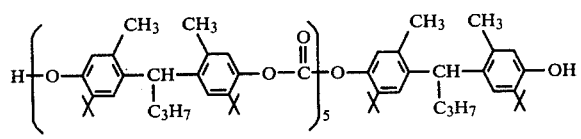
Na 7
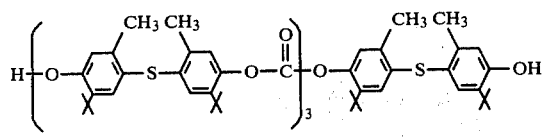
Na 8
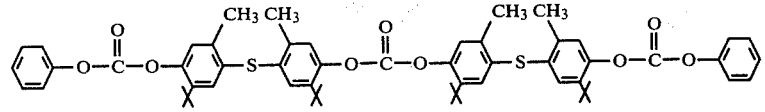
Na 9
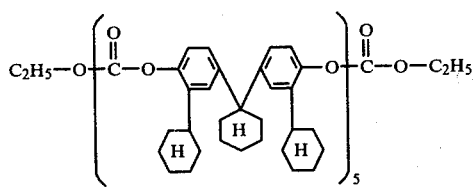
Na 10
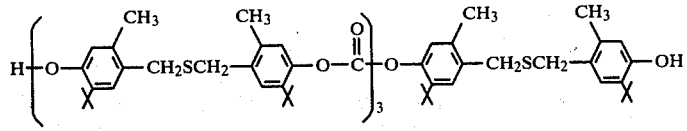
Na 11
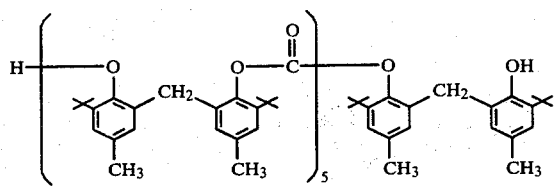
Na 12

TABLE 2-continued
CARBONATE ESTERS OF DIHYDRIC AND TRIHYDRIC PHENOLS
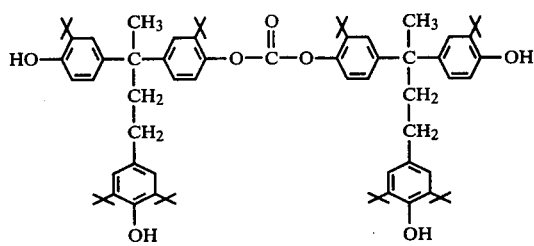
Na 13
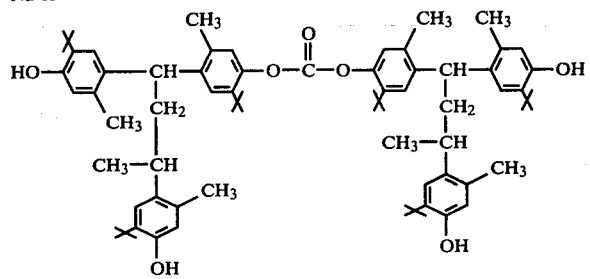
Na 14
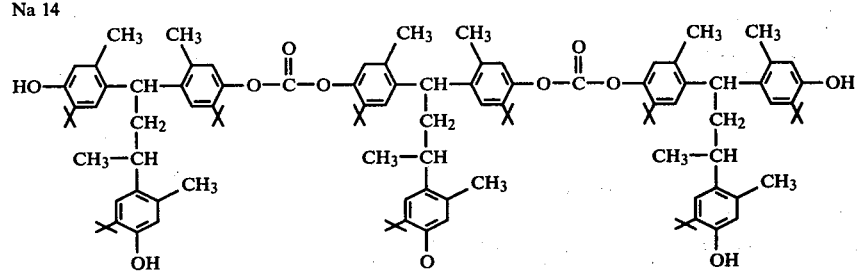
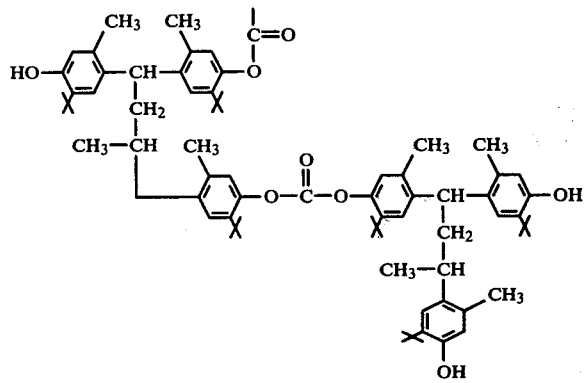
Na 15
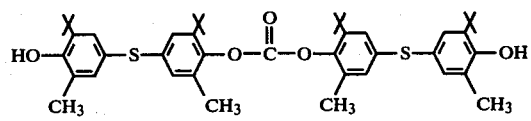
Na 16
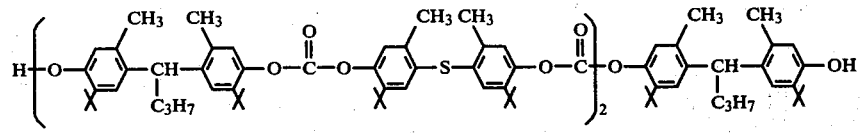
Na 17

TABLE 2-continued
CARBONATE ESTERS OF DIHYDRIC AND TRIHYDRIC PHENOLS

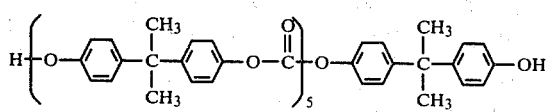

Aliphatic Dicarboxylate - Carbonate Coesters of Dihydric And Trihydric Phenols.

COMPOUND 18

Thiodipropionic acid diphenyl ester 13.2 g (0.04 mole), 4,4'-butylidenebis(3-methyl-6-t-butylphenol) 30.6 g (0.08 mole) and sodium methoxide 0.04 g were heated to 150° C. under the nitrogen atomosphere. Then, reaction was carried out for 5 hours while distilling out phenol under reduced pressure (3 mm Hg). The quantity of phenol distillate was 7.7 g representing 103% of the calculated quantity.

Diphenylcarbonate 6.4 g (0.03 mole) and potassium carbonate 0.04 g were added and reacted at 145° C. for 3 hours under a nitrogen atmosphere, and then for 3 hours under reduced pressure while distilling out phenol, 5.8 g or 102% of the calculated quantity.

A glassy solid of m.p. 95°–102° C., molecular weight 3720 was obtained (Compound No. 18). The molecular weight was measured by a vapor pressure method.

The following polyhydric phenol coester compounds in Table 3 were obtained by the same procedure as Compound 18 by varying the aliphatic dicarboxylic acid diphenyl ester and polyhydric phenol reactants.

TABLE 3

| COMPOUND No. | DICARBOXYLIC ACID DIPHENYL ESTER | POLYHYDRIC PHENOL | MELTING POINT | MOLECULAR WEIGHT |
|---|---|---|---|---|
| 19 | 3,3'-thiodipropionic acid diphenyl ester | 4,4'-thiobis(3-methyl-6-t-butylphenol) | 90–97° C. | 3,520 |
| 20 | 3,3'-thiodipropionic acid diphenyl ester | Bisphenol A | 128–135 | 2,480 |
| 21 | Adipic acid diphenyl ester | 4,4'-isopropylidene bis (2-t-butylphenol) | 110–116 | 3,250 |

COMPOUND 22

1,1,3-tris(2'-methyl-4'-hydroxy-5-t-butylphenyl) butane 21.8 g (0.04 mol), triethyl amine 10 ml and benzene 90 ml were mixed and thiodipropionic acid dichloride 4.9 g (0.02 mole) added dropwise at room temperature. After the addition, the reaction was continued for 3 hours under reflux and cooled.

An amine hydrochloride precipitated and was filtered after which the benzene solution was washed with water and dried.

A yellow solid product was obtained. Diphenylcarbonate 2.1 g (0.01 mole) and potassium carbonate 0.02 g were added and reacted at 140° C. for 3 hours under nitrogen and then 2 hours more under reduced pressure (3 mm Hg) while distilling out phenol 1.8 g or 95% of the calculated quantity.

A light yellow glassy solid of m.p. 72°–80° C., m.w. 2490 was obtained. (COMPOUND 22).

In the same way as Compound 22 the compounds obtained by varying the dicarboxylic acid dichloride and polyhydric phenol are shown in Table 4.

TABLE 4

| COMPOUND No. | DICARBOXYLIC ACID DICHLORIDE | POLYHYDRIC PHENOL | MELTING POINT | MOLECULAR WEIGHT |
|---|---|---|---|---|
| 23 | Thiodipropionic acid dichloride | 4,4'-cyclohexylidene bisphenol | 86–90° C. | 1,390 |
| 24 | Sebacic acid dichloride | 4,4'-butylidene bis (3-methyl-6-t-butylphenol) | 65–73 | 1,890 |
| 25 | Succinic acid dichloride | 4,4'-butylidene bis (3-methyl-6-t-butylphenol) | 83–91 | 1,720 |

COMPOUND 26

3.3'-Thiodipropionic acid diphenyl ester 9.9 g (0.03 mole), 4,4'-cyclohexylidenebis (2-cyclohexylphenol) 25.9 g (0.06 mole) and sodium methoxide 0.04 g were mixed under nitrogen and reacted at 150° C. for 5 hours under reduced pressure (3 mm Hg) while distilling out 5.5 g phenol (98% of calculated quantity). Then, diphenylcarbonate 8.6 g (0.04 mole), cyclohexylidenebis (2-cyclohexylphenol) 8.6 g (0.02 mole) and potassium carbonate 0.05 g were added and reacted at 145° C. for 2.5 hours under reduced pressure (3 mm Hg) while distilling out 4.0 g phenol (101% of the calculated quantity). A glassy solid of m.p. 93°–98° C. and m.w. 4000 was obtained (Compound 26)

The compounds obtained in the same procedure as Compound 26 by varying the dicarboxylic acid diphenylester and polyhydric phenol are shown in Table - 5.

TABLE 5

| No. | Dicarboxylic acid Diphenylester | Polyhydric phenol | Melting point | Molecular weight |
|---|---|---|---|---|
| 27 | Succinic acid disphenylester | bisphenol A | 119–125° C. | 2,180 |
| 28 | adipic acid diphenylester | 4,4'-methylene bis (2-methyl-6-t-butylphenol) | 96–102° C. | 3,170 |

COMPOUND 29

4,4'-Butylidenebis (3-methyl-6-t-butylphenol) 22.9 g (0.06 mole), diphenylcarbonate 6.4 g (0.03 mole) and potassium carbonate 0.03 g were charged and heated to 150° C. under nitrogen. Then, after the reaction of 3 hours in the same temperature, stripping of phenol was carried out for 3 hours under reduced pressure (3 mm Hg) to give 6.1 g phenol or 103% of the calculated quantity. After cooling, benzene 150 ml and triethylamine 10 ml were added and then adipic acid dichloride 3.2 g (0.015 mole) dropwise at room temperature. After the addition, the reaction was continued for 6 hours under reflux, the precipitated amine hydrochloride filtered after cooling and a glassy solid was obtained by distilling out solvent after washing with water and drying. The coester (Compound 29) had melting point 83°–87° C. and molecular weight 1700.

In the same way, the compounds in Table - 6 were obtained by varying the polyhydric phenol and dicarboxylic acid dichloride.

TABLE 6

| Stabilizer No. | Dicarboxylic acid dichloride | Polyhydric phenol | Melting point | Molecular weight |
| --- | --- | --- | --- | --- |
| 30 | sebacic acid dichloride | 1,1,3-tris (2'-methyl-4'-hydroxy-5'-t-butyl-phenyl) butane | 78–84° C. | 2,400 |
| 31 | thiodipropionic acid dichloride | 4,4'-methylenebis (2-methyl-6-t-butylphenol) | 89–90° C. | 1,560 |
| 32 | adipic acid dichloride | 4,4'-thiobis (3-methyl-6-t-butylphenol) | 92–99° C. | 1,600 |

COMPOUND 33

Sebacid acid diphenylester 7.1 g (0.02 mole), 4,4'-cyclohexylidene diphenol 10.7 g (0.04 mole), and sodium methoxide 0.02 g were reacted at 160° C. for 3 hours under nitrogen atmosphere, then phenol was stripped for 4 hours under reduced pressure (3 mm Hg) giving 3.8 g or 100% of the calculated quantity. Then diphenyl carbonate 17.1 g (0.08 mole), 4,4'-cyclohexylidene bisphenol 18.8 g (0.07 mole) and potassium carbonate 0.05 g were added, reacted for 4 hours and stripped for a further 3 hours under reduced pressure (3 mm Hg) giving 14.4 g or 96% of the calculated quantity of phenol.

A glassy solid of m.p. 131°–137° C. and molecular weight 3500 was obtained (Compound 33).

The compounds obtained by applying the same procedure to various aliphatic dicarboxylic acids and polyhydric phenols are shown in Table - 7.

TABLE 7

| Compound No. | Dicarboxylic Acid Diphenylester | Polyhydric Phenol | Melting Point | Molecular Weight |
| --- | --- | --- | --- | --- |
| 34 | thiodipropionic acid diphenylester | 4,4'-isopropylidene bis (2-t-butylphenol) | 122–130° C. | 4,690 |
| 35 | sebacic acid diphenylester | bisphenol A | 140–146° C. | 3,070 |

COMPOUND 36

Thiodipropionic acid dichloride 7.4 g (0.03 mole) was added dropwise to a solution of 4,4'-butylidene-bis (3-methyl-6-t-butylphenol) 22.9 g (0.06 mole), triethyl amine 10 ml and benzene 90 ml at room temperature. After addition, reaction was continued for 3 hours under reflux, the amine hydrochloride filtered off after cooling and the solvent then stripped, Diphenylcarbonate 6.4 g (0.03 mole), 1,1,3-tris (2-methyl-4-hydroxy-5-t-butylphenyl) butane 16.3 g (0.03 mole) and potassium carbonate 0.05 g were added and phenol was stripped out at 145° C. for 3 hours under reduced pressure (3 mm Hg) and another 3 hours to give 5.3 g or 94% of the calculated quantity of phenol. A light yellow glassy solid of m.p. 92°–98° C. and molecular weight 1480 was obtained (Compound 36).

INORGANIC ACID - CARBONIC ACID COESTERS OF DIHYDRIC AND TRIHYDRIC PHENOLS

COMPOUND 37

Triphenylphosphite (TPP) 31.0 g (0.1 mole), 4,4'-n-butylidenebis(3-methyl-6-t-butylphenol) 190.0 g (0.5 mole), 64.2 g (0.3 mole) diphenyl carbonate (DPC) and 0.3 g potassium carbonate were heated at 160° C. under the nitrogen atmosphere. Then vacuum was applied for 2 hours while distilling out phenol under reduced pressure (3 mm Hg). The quantity of phenol distillate was 65.2 g or 0.69 mole representing 76% of the maximum calculated (3 mm Hg) quantity.

A pale yellow solid of M.P. 110°–120° C., molecular weight 1880 was obtained (Compound 37). The molecular weight was measured by a vapor pressure method.

The following polyhydric phenol coester compounds in Table 8 were obtained by the same procedure as Compound 37 by varying the polyhydric phenol and the molar proportions of the reactants.

TABLE 8

| Compound NO. | POLYHYDRIC PHENOL (PHP) | MOLAR RATIO TPP:DPC:PHP | MELTING POINT °C. | APPROXIMATE MOLECULAR WEIGHT |
| --- | --- | --- | --- | --- |
| 38 | Bisphenol A | 2:2:5 | 75–80 | 1,290 |
| 39 | 4,4'Thiobis(3-methyl-6-t--butyl)phenol | 1:4:6 | 125–136 | 2,100 |
| 40 | 4,4'-cyclohexylidene bis(2--cyclohexylphenol) | 1:2:4 | 80–100 | 1,700 |
| 41 | 1,1,3-tris(2'-methyl-5'-t- | 2:1:4 | 81–93 | 2,200 |

COMPOUND 42

Diphenyl 2-ethylhexylphosphite (DEP) 69.2 g (0.2 mole), diphenylcarbonate (DPC) 64.2 g (0.3 mole) and 136.8 g (0.6 mole) bisphenol A and potassium carbonate 0.26 g were reacted at 140° C. for 3 hours under nitrogen and then 24 hours more under reduced pressure (3 mm Hg) while distilling out 85.1 g phenol (0.91 mole) or 75% of the maximal calculated quantity.

A colorless glassy solid of m.p. 54°–58° C., m.w. 1600 was obtained. (Compound 42).

In the same way as EXAMPLE 8, the compounds obtained by varying the polyhydric phenol and the molar proportions of reactants are shown in Table 9.

TABLE 9

| Compound Number | POLYVALENT PHENOL (PVP) | MOLAR RATIO DEP:DPC:PVP | MELTING POINT (°C.) | M.W. |
|---|---|---|---|---|
| 43 | 4,4'-n-butylidene bis (2-t-butyl-5-methyl phenol) | 1:1:3 | 45–62 | 1535 |
| 44 | 2,2-bis(3-t-butyl-4-hydroxyphenyl) butane | 2:1:2 | — | 1486 |
| 45 | Bis phenol A:4,4'-n-butylidene bis(2-t-butyl-5-methylphenol) (2:2 mixture) | 1:2:4 | 50–63 | 1287 |

COMPOUND 46

46.8 g (0.2 mole) of diphenyl hydrogen phosphite, 42.8 g (0.2 mole) of diphenyl carbonate, 114.0 g (0.5 mole) of bisphenol A and 0.2 g of potassium carbonate were reacted for 3 hours at 160° C. under nitrogen stream, and then 70.4 g (0.75 mole) of produced phenol was distilled out during 2 hours in vacuum (3 mmHg).

A pale yellow solid was obtained having m.p. 80°–90° C.

COMPOUND 47

65.2 g (0.2 mole) of triphenylphosphate (TPPa), 42.8 g (0.2 mole) of diphenylcarbonate (DPC), 191.0 g (0.5 mole) of 4,4'-n-butylidenebis(2-t-butyl-5-methyl phenol) and 0.4 g of potassium carbonate were reacted for 3 hours at 165° C. under a nitrogen stream, and then 56.4 g (0.6 mole) of produced phenol was distilled out during 3 hours in vacuum (3 mmHg).

A pale yellow glassy solid was obtained (Compound 47) having a m.p. 85°–97° C. and M.W. 1723.

Compounds 48–50 were prepared according to the same procedure as Compound 47 and described in Table 10.

TABLE 10

| Compound Number | POLYVALENT PHENOL (PVP) | MOLAR RATIO TPPa:DPC:PVP | M.P. (°C.) | M.W. |
|---|---|---|---|---|
| 48 | 4,4'-isopropylidene bis (2-t-butyl phenol) | 1:3:5 | 97–115 | 989 |
| 49 | 4,4'-thiobis(3-methyl-6-t-butylphenol) | 2:1:2 | 81–93 | 814 |
| 50 | 1,1,3-tris(2-methyl-4-hydroxy-5-t-butylphenyl) butane | 1:2:3 | 112–117 | 1457 |

COMPOUND 51

58.0 g (0.2 mole) of triphenyl borate (TPB), 42.8 g (0.2 mole) of diphenyl carbonate (DPC), 191.0 g (0.5 mole) of 4,4'-butylidene bis(2-t-butyl-5-methyl phenol) and 0.2 g of potassium carbonate were reacted for 3 hours at 150° C. under a nitrogen stream and then 71.4 g (0.76 mole) of produced phenol was distilled out during 3 hours in vacuum (3 mmHg). Compounds 52–54 prepared by the same procedure are described in Table 11.

TABLE 11

| COMPOUND NO. | POLYVALENT PHENOL (PVP) | MOLAR RATIO TPB:DPC:PVP | MELTING POINT (°C.) | M.W. |
|---|---|---|---|---|
| 52 | Bisphenol A | 2:1:5 | 62–67 | 1147 |
| 53 | 2,2-bis(3-t-butyl-4-hydroxy phenyl)-4-3,5-di-t-butyl-4-hydroxy phenyl)butane | 1:2:4 | 84–90 | 2154 |
| 54 | 4,4'-cyclohexylidene bis(2-cyclohexylphenol) | 2:2:3 | 56–69 | 1396 |

ORGANOPHOSPHONATE-CARBONATE COESTERS OF DIHYDRIC AND TRIHYDRIC PHENOLS

COMPOUNDS 55–67

Compound 55, phenyl 3,5,-di-t-butyl-4-hydroxybenzyl phosphate-carbonate of 4,4'-n-butylidene bis(2-t-butyl-5-methylphenol)

4,4'-n-Butylidenebis(2-t-butyl-5-methyl phenol) 114.6 g (0.3 mole), diphenyl carbonate 32.1 g (0.15 mole) and potassium carbonate 0.15 g were heated to 140°–145° C. under nitrogen atmosphere and then reacted for 2.5 hrs. After the reaction produced phenol was distilled out under reduced pressure. Diphenyl (3,5-di-t-butyl-4-hydroxy benzyl) phosphonate 135.6 g and sodium hydride 0.5 g were added and reacted at 170°–175° C. for 1 hour under nitrogen atmosphere and a further 4 hours at 170°–185° C. under reduced pressure while distilling out phenol. A glassy solid of melting point 120°–125° C. was obtained as residue.

Compound 57, phenyl 3,5-di-t-butyl-4-hydroxybenzyl phosphonate-carbonate of 1,1,3-tris(2'-methyl-4''-hydroxy-5'-t-butylphenyl) butane 1,1,3-Tris(2'-methyl-4'-hydroxy-5'-t-butylphenyl) butane 109 g (0.2 mole), diphenyl carbonate 21.4 g (0.1 mole), diphenyl (3,5-di-t-butyl-4-hydroxy benzyl) phosphonate 181 g (0.4 mole) and sodium hydride 1.0 g were reacted at 170°–175° C. for 1.5 hr. under nitrogen atmosphere, and additional 4 hours, at 170°–185° C. while distilling out produced phenol. A glassy solid of melting point 126°–131° C. was obtained.

These and other polyhydric phenol carbonate-organophosphonate coesters used according to this invention are shown by name, formula, and average molecular weight in Table 12. Where no other molar ratio is indicated, the molar ratio of polyhydric, phenol groups to carbonate ester groups is 2:1.

TABLE 12

No. 55

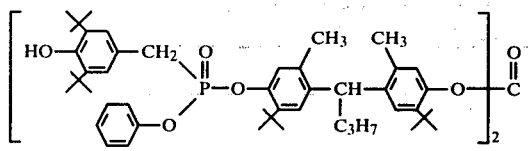

Bis(O-phenyl-P(3,5-di-t-butyl-4-hydroxyphenylmethane)phosphonate of 4,4'-n-butylidenebis(2-t-butyl-5-methylphenol)) carbonate. M.P. 120–125° C., average molecular weight 1500

No. 56

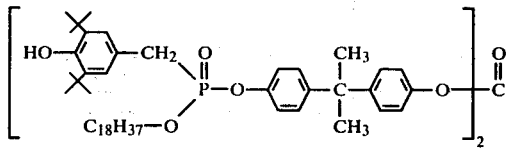

Bis(O-n-octadecyl-P(3,5-di-t-butyl-4-hydroxyphenylmethane) phosphonate of 4,4'-isopropylidenediphenol)carbonate, average molecular weight 1600

No. 57

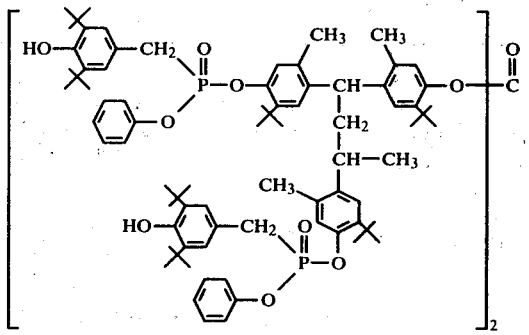

Bis(O-Phenyl-P(3,5-di-t-butyl-4-hydroxyphenylmethane)phosphonate of 1,1,3-tris(2-methyl-4-hydroxy-5-t-butylphenyl) butane)carbonate, Melting Point 126–131° C., average molecular weight 2600

No. 58

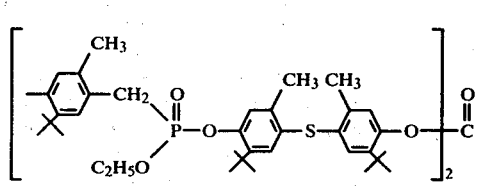

Bis(O-ethyl-P(2,3-dimethyl-4-hydroxy-5-t-butylphenylmethane) phosphonate of 4,4'-thiobis(2-t-butyl-5-methylphenol))carbonate average molecular weight 1300

No. 59

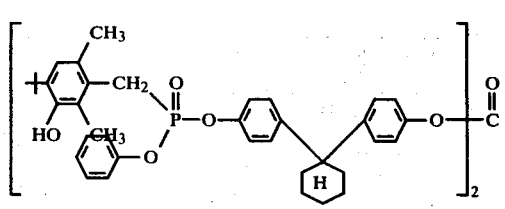

Bis(O-phenyl-P(2,6-dimethyl-3-hydroxy-4-t-butylphenylmethane) phosphonate of 4,4'-cyclohexylidenediphenol)carbonate, average molecular weight 1200

TABLE 12-continued

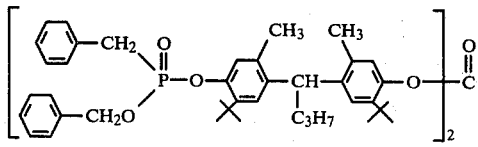

Bis(O-benzylP-phenylmethanephosphonate of 4,4'-n-butylidene-
bis(2-t-butyl-5-methylphenol))carbonate, average molecular
weight 1300

No. 60

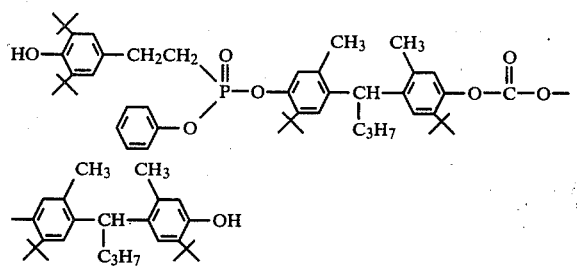

O-Phenyl-P(3,5-di-t-butyl-4-hydroxyphenyl ethane)mono phosphonate of
4,4'-n-butylidene bis(2-t-butyl-5-methylphenol)carbonate
average molecular weight 1200

No. 61

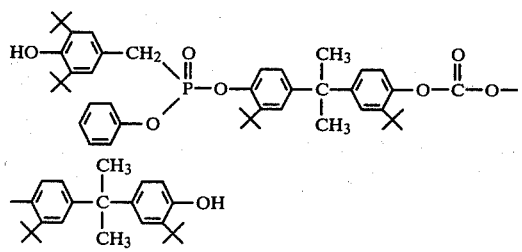

O-Phenyl-P(3,5-di-t-butyl-4-hydroxyphenylmethane)monophosphonate
of 4,4'-isopropylidene bis(2-t-butylphenol)carbonate average
molecular weight 1100

No. 62

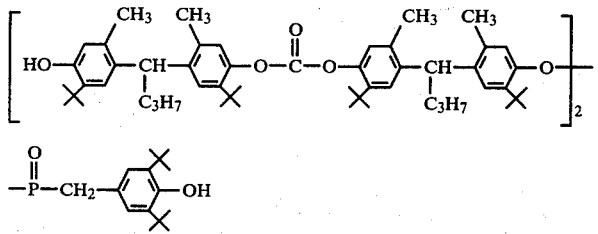

Bis(4,4'-n-butylidene bis(2-t-butyl-5-methylphenol)carbonate)
P-3,5-di-t-butyl-4-hydroxyphenylmethanephosphonate, average
molecular weight 1800

No. 63

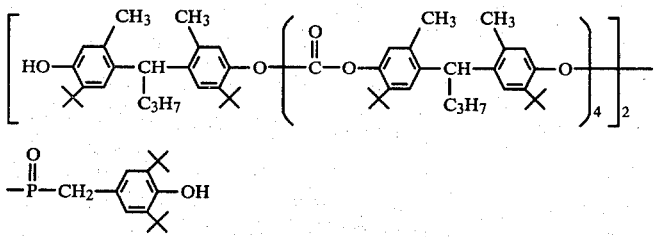

Bis(4,4'-n-butylidenebis(2-t-butyl-5-methylphenol)5:4 molar
ratio carbonate) P(3,5-di-t-butyl-4-hydroxyphenyl)methane-
phosphonate, average molecular weight 4300

No. 64

TABLE 12-continued

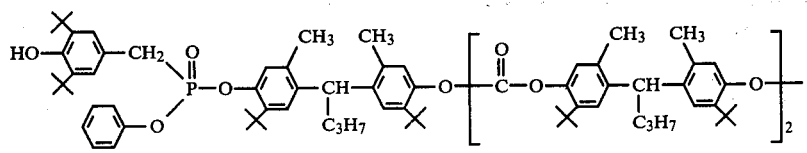

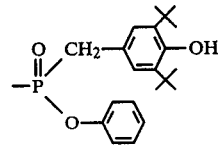

No. 65

4,4'-n-Butylidenebis(2-t-butyl-5-methylphenol) 3:2 molar ratio carbonate bis(O-phenyl-P(3,5-di-t-butyl-4-hydroxyphenyl)methanephosphonate), average molecular weight 1900

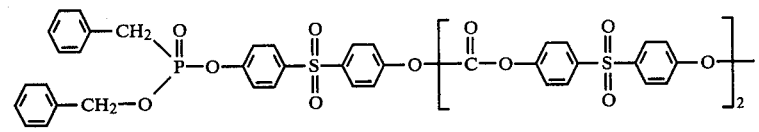

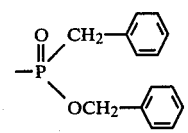

No. 66

4,4'-Sulfonyldiphenol 3:2 molar ratio carbonate bis(O-benzyl-P-phenylmethanephosphonate) average molecular weight 1300

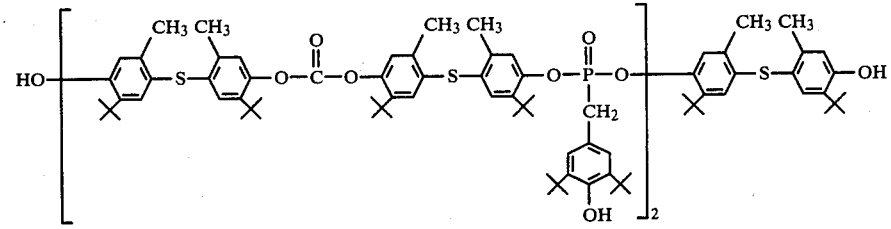

No. 67

4,4'-Thiobis(2-t-butyl-5-methylphenol) carbonate-P(3,5-di-t-butyl-4-hydroxyphenyl)methanephosphonate, 5:2:2 molar ratio, average molecular weight 2400.

The compounds shown in Tables 1 to 12 were tested for polypropylene, polyethylene, polybutene-1, ABS, PVC, ethylene-vinyl acetate copolymer and polytetramethylene terephthalate polymer as stabilizer, as described in the following examples.

EXAMPLE 1

Polypropylene resin (Profax 6501) 100 parts by weight, carbonate compound 0.2 part by weight and thiodipropionate oligo ester 0.2 part by weight were mixed for ten minutes by mixing and grinding machine and milled and molded to make a sheet of 1.0 mm in thickness. From this sheet were cut ten sample pieces of 10×20 mm of each formulation, and exposed on aluminum foil in a Geer air-circulating oven at 160° C. for heat stability examination.

Ten additional sample pieces of the same size cut from each sheet were kept for 7 days in water at 90° C. and then oven tested at 160° C. The time to the beginning of degradation was taken as the time when more than five sample pieces in ten of each formulation were discolored and brittle.

The results are shown in Table 13.

TABLE 13

| No. | Carbonate Compound | Thiodipropionate Compound | Deterioration Beginning Time HRS. | Steeped in Hot Water HRS. |
|---|---|---|---|---|
| Control | | | | |
| 1-1 | 2,6-di-t-butyl-p-cresol | dilaurylthiodipropionate | 280 | 120 |
| 1-2 | stearyl-3,5-di-t-butyl-4-hydroxyphenyl propionate | distearylthiodipropionate | 570 | 230 |
| EXAMPLE | | | | |
| 1-1 | No. 3 | No. S-5 | 1330 | 1260 |
| 1-2 | No. 6 | No. S-7 | 1480 | 1410 |
| 1-3 | No. 13 | No. S-1 | 1450 | 1380 |
| 1-4 | No. 22 | No. S-3 | 1360 | 1290 |
| 1-5 | No. 30 | No. S-9 | 1410 | 1330 |
| 1-6 | No. 41 | No. S-6 | 1290 | 1230 |
| 1-7 | No. 49 | No. S-12 | 1420 | 1350 |
| 1-8 | No. 57 | No. S-8 | 1300 | 1230 |
| 1-9 | No. 61 | No. S-10 | 1460 | 1380 |

TABLE 13-continued

| No. | Carbonate Compound | Thiodipropionate Compound | Deterioration Beginning Time HRS. | Steeped in Hot Water HRS. |
|---|---|---|---|---|
| 1-10 | No. 66 | No. S-4 | 1400 | 1340 |

The results demonstrate the dramatically superior stabilizing effectiveness of the compositions of this invention compared to combinations of well-known commercially accepted phenolic and thiodipropionate ester stabilizers.

EXAMPLE 2

Polyethylene resin (Hi-Zex 5100E) 100 parts by weight, carbonate compound 0.05 part by weight and thiodipropionate compound 0.1 part by weight were milled on a two roll mill 5 minutes at 150° C. and then molded into a sheet of 1.2 mm thickness by compression molding at 150° C. and 180 kg/cm² for 5 minutes. The sheet was cut into sample pieces of 10×20 mm and tested for heat stability in the Geer oven at 148.5° C. in air or aluminum foil. The time to the beginning of degradation was taken as the time when more than five sample pieces in ten of each formulation were discolored and waxy.

The stabilizer ingredients used and the results obtained are shown in Table 14.

TABLE 14

| No. | Caronate Compound | Thiodipropionate Compound | Deterioration Beginning Time HRS. |
|---|---|---|---|
| Control | | | |
| 2-1 | 4,4'-butylidene bis(2-t-butyl-5-methyl phenol) | No. S-3 | 385 |
| 2-2 | No 8 | dilaurylthiodipropionate | 427 |
| EXAMPLE | | | |
| 2-1 | No. 2 | No. S-6 | 552 |
| 2-2 | No. 8 | No. S-1 | 565 |
| 2-3 | No. 15 | No. S-9 | 556 |
| 2-4 | No. 20 | No. S-2 | 522 |
| 2-5 | No. 32 | No. S-11 | 513 |
| 2-6 | No. 35 | No. S-7 | 560 |
| 2-7 | No. 39 | No. S-10 | 558 |
| 2-8 | No. 50 | No. S-3 | 541 |
| 2-9 | No. 56 | No. S-12 | 508 |
| 2-10 | No. 62 | No. S-8 | 530 |

The results show the unexpected advantage of the compositions of this invention compared to combinations of a carbonate ester with a thiodipropionate not of this invention or a dihydric alcohol thiodipropionate with a conventional phenolic stabilizer.

EXAMPLE 3

In order to examine the effect of the stabilizer according to this invention on polybutene resin, a sheet of 1 mm in thickness was prepared by kneading the following formulation on a two roll mill and then compression molding at 160° C. and 200 kg/cm² for 5 minutes. The sheet obtained was cut to the size of 40×150 mm, and suspended in an individual glass cyclinder.

Each cyclinder was set in an air circulating oven at 160° C., flushed with pure oxygen, the pressure adjusted to one atmosphere, and the cyclinder fitted with a closed end manometer. The time to beginning of oxidation-degradation was read by recording the time when the pressure in the cyclinder diminished rapidly.

The ingredients of the stabilizer combination used in each example and the results observed are shown in Table 15.

| (FORMULATION) | |
|---|---|
| Un-stabilized poly-1-butene resin | 100 parts by weight |
| Calcium stearate | 1.0 |
| Carbonate compound | 0.2 |
| Thiodipropionate compound | 0.2 |

TABLE 15

| No. | Carbonate Compound | Thiodipropionate Compound | Deterioration Beginning Time HRS. |
|---|---|---|---|
| Control | | | |
| 3-1 | Pentaerythritol-tetra(3,5-di-t-butyl-4-hydroxyphenyl)propionate | dilauryl thiodipropionate | 436 |
| EXAMPLE | | | |
| 3-1 | No. 4 | No. S-11 | 606 |
| 3-2 | No. 11 | No. S-4 | 668 |
| 3-3 | No. 18 | No. S-8 | 617 |
| 3-4 | No. 27 | No. S-5 | 670 |
| 3-5 | No. 36 | No. S-3 | 623 |
| 3-6 | No. 42 | No. S-9 | 646 |
| 3-7 | No. 52 | No. S-10 | 661 |
| 3-8 | No. 54 | No. S-2 | 645 |
| 3-9 | No. 59 | No. S-6 | 624 |
| 3-10 | No. 64 | No. S-12 | 637 |

The results show the superiority of compositions of this invention over compositions containing a conventional thiodipropionate ester with a phenolic antioxidant widely respected as the best phenolic antioxidant available.

EXAMPLE 4

ABS resin 100 parts by weight, Zinc stearate 0.5 part by weight, carbonate compound 0.1 part by weight and thiodipropionate compound 0.2 part by weight were milled on a two roll mill and then molded into a sheet of 0.5 mm thickness by compression molding. Then the sheet was heated for 20 hours in a Geer oven at 135° C. and the color of this sheet was measured for whiteness using the Hunter color difference meter.

The results are shown in Table 16.

TABLE 16

| No. | Carbonate Compound | Thiodipropionate Compound | Whiteness |
|---|---|---|---|
| Control | | | |
| 4-1 | None | None | 0.13 |
| 4-2 | No. 33 | dilauryl thiodipropionate | 0.22 |
| EXAMPLE | | | |
| 4-1 | No. 5 | No. S-5 | 0.35 |
| 4-2 | No. 9 | No. S-2 | 0.31 |
| 4-3 | No. 16 | No. S-12 | 0.35 |
| 4-4 | No. 23 | No. S-7 | 0.38 |
| 4-5 | No. 29 | No. S-8 | 0.34 |
| 4-6 | No. 33 | No. S-4 | 0.39 |
| 4-7 | No. 45 | No. S-10 | 0.32 |
| 4-8 | No. 53 | No. S-11 | 0.40 |
| 14-9 | No. 60 | No. S-6 | 0.32 |
| 4-10 | No. 67 | No. S-1 | 0.37 |

The results demonstrate the unexpectedly advantageous properties of the stabilizer composition of the invention in ABS polymer. The contrast between Control 4-2 and Example 4-6 is especially noteworthy, since the same carbonate ester is used in both samples and the use of dihydric alcohol thiodipropionate ester S-4 gives a much whiter product than dilauryl thiodipropionate with the same carbonate ester.

EXAMPLE 5

A clear sheet was prepared by kneading polyvinylchloride resin (Geon 103EP) 100 parts, dioctylphthalate 42 parts, epoxidized soybean oil 3 parts, zinc stearate 0.3 part, barium stearate 0.5 part, stearic acid 0.3 part, carbonate compound 0.5 part and thiodipropionate compound 0.2 part on a two roll mill at 175° C. for 5 minutes and then compression molding at 175° C. Then, a heat stability test was carried out in a Geer oven at 190° C. in an air atmosphere. The time to degradation was determined by the discoloration observed.

The results obtained are shown in Table 17.

TABLE 17

| NO | Carbonate Compound | Thiodipropionate Compound | Beginning Time of Deterioration | |
|---|---|---|---|---|
| | | | Yellowed MIN. | Blackened MIN. |
| Control | | | | |
| 5-1 | None | None | 30 | 40 |
| 5-2 | Bisphenol A | Dilaurylthiodi- propionate | 40 | 50 |
| EXAMPLE | | | | |
| 5-1 | No. 1 | No. S-3 | 65 | 80 |
| 5-2 | No. 12 | No. S-1 | 70 | 85 |
| 5-3 | No. 19 | No. S-7 | 75 | 95 |
| 5-4 | No. 24 | No. S-2 | 65 | 85 |
| 5-5 | No. 26 | No. S-5 | 65 | 80 |
| 5-6 | No. 37 | No. S-9 | 70 | 90 |
| 5-7 | No. 40 | No. S-4 | 70 | 95 |
| 5-8 | No. 48 | No. S-8 | 75 | 95 |
| 5-9 | No. 55 | No. S-11 | 65 | 85 |
| 5-10 | No. 63 | No. S-10 | 70 | 85 |

The stabilizer compositions of the invention in Examples 5-1 through 5-10 are unexpectedly effective in providing longer time to yellowing than conventional control compositions take to turn black.

EXAMPLE 6

In order to examine the effects of the stabilizer according to this invention in ethylene-vinylacetate copolymer, samples were prepared according to the following formulation and tested for heat stability in a Geer oven at 175° C. and initial color was measured for yellowness using the Hunter color difference meter, greater numbers indicating more severe discoloration.

The results are shown in Table 18. The heat stability is expressed in minutes of heating in the oven until a red or brown discoloration was observed.

(FORMULATION)

| Ethylene-vinylacetate copolymer resin | 100 parts |
|---|---|
| Montan wax ester lubricant | 0.3 |
| Carbonate compound | 0.05 |
| Thiodipropionate compound | 0.1 |

TABLE 18

| No. | Carbonate Compound | Thiodipropionate Compound | Heat Stability Min. | Initial Color |
|---|---|---|---|---|
| Control | | | | |
| 6-1 | None | None | 75 | 0.35 |
| 6-2 | 2,6-di-t-p-cresol | distearylthiodi- propionate | 90 | 0.26 |
| EXAMPLE | | | | |
| 6-1 | No. 7 | No. S-11 | 150 | 0.08 |
| 6-2 | No. 14 | No. S-2 | 150 | 0.09 |
| 6-3 | No. 25 | No. S-5 | 135 | 0.11 |
| 6-4 | No. 28 | No. S-7 | 150 | 0.09 |
| 6-5 | No. 34 | No. S-1 | 150 | 0.10 |
| 6-6 | No. 38 | No. S-12 | 135 | 0.09 |
| 6-7 | No. 46 | No. S-4 | 135 | 0.10 |
| 6-8 | No. 51 | No. S-9 | 150 | 0.08 |
| 6-9 | No. 58 | No. S-3 | 135 | 0.09 |
| 6-10 | No. 65 | No. S-6 | 150 | 0.08 |

The ethylene-vinyl acetatepolymer compositions stabilized with compositions of this invention in Examples 6-1 through 6-10 manifest far better heat stability and color retention than compositions without stabilizer or with a known combination of recognized effective stabilizers.

EXAMPLE 7

The test pieces were prepared from polytetramethyleneterephthalate 100 parts by weight, carbonate compound 0.2 part and thiodipropionate compound 0.2 part by injection molding. The tensil strength retention of the test pieces after heating at 150° C. for 240 hours was measured.

The results are shown in Table 19.

TABLE 19

| No. | Carbonate Compound | Thiodipropionate Compound | Tensile Strength Retention % |
|---|---|---|---|
| Control | | | |
| 7-1 | None | None | 55 |
| EXAMPLE | | | |
| 7-1 | No. 6 | No. S-3 | 82 |
| 7-2 | No. 10 | No. S-1 | 78 |
| 7-3 | No. 17 | No. S-4 | 76 |
| 7-4 | No. 18 | No. S-8 | 81 |
| 7-5 | No. 21 | No. S-10 | 79 |
| 7-6 | No. 31 | No. S-11 | 75 |
| 7-7 | No. 37 | No. S-6 | 78 |
| 7-8 | No. 47 | No. S-9 | 81 |
| 7-9 | No. 55 | No. S-5 | 77 |
| 7-10 | No. 57 | No. S-7 | 80 |

The outstanding retention of tensile strength shown by terephthalic acid ester polymers stabilized with a composition of this invention is evident from the results shown.

We claim:

1. A stabilizer composition capable of enhancing the resistance of a synthetic resin to deterioration upon heating, comprising in combination (A) at least one thiodipropionic acid ester of a dihydric alcohol having 2 to 10 carbon atoms and a chain terminator linked to an ester group, the thiodipropionic acid ester being represented by the formula.

-continued

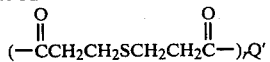

in which Q and Q' are independently selected from the group consisting of hydrocarbyl having 1 to 21 carbon atoms, and alkylthioalkylenecarbonyl having 1 to 18 carbon atoms in the alkyl group and 1 to 2 carbon atoms in the alkylene group; G is a residue of an open chain or cyclic dihydric alcohol having 2 to 10 carbon atoms selected from the group consisting of bivalent hydrocarbon and thiahydrocarbon groups; p and r are 0 or 1 and q is an integer from 1 to 20, provided that q+r is at least 2, and (B) at least one 700 to 10,000 molecular weight carbonate ester of a polyhdric phenol, represented by the formula.

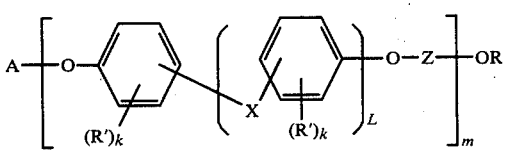

in which independently at each occurrence R' is selected from the group consisting of alkyl and cycloalkyl radicals; A is selected from the group consisting of hydrogen and —Z—O—R; R is selected from the group consisting of alkyl and

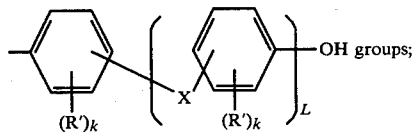

X selected from the group consisting of —S—, —CH$_2$SCH$_2$—, and a divalent hydrocarbon radical; Z is

K is an integer from 0 to 2; L is 1; and m is 1 to about 20, the weight ratio of the thiodipropionic acid ester to the carbonate ester being in the range from 2 to 1 to 1 to 1.

2. A stabilizer composition according to claim 1 in which the thiodipropionic acid ester is an ester of cyclohexane-1,4-dimethanol.

3. A stabilizer composition according to claim 1 in which the thiodipropionic acid ester is an ester of 2,2-dimethylpropanediol.

4. A stabilizer composition according to claim 1 in which the thiodipropionic acid ester is an ester of a polymethylenediol having 2 to 10 methylene groups.

5. A stabilizer composition according to claim 1 in which the thiodipropionic acid ester is an ester of 2,2'-thiodiethanol.

6. A stabilizer composition according to claim 1 in which the chain terminator is an aliphatic alcohol having 1 to 21 carbon atoms.

7. A stabilizer composition according to claim 1 in which the chain terminator is an alkylthioalkylenecarboxylic acid having 1 to 18 carbon atoms in the alkyl group and 1 to 2 carbon atoms in the alkylene group.

8. A stabilizer composition according to claim 1 in which in the formula of the carbonate ester X is a divalent hydrocarbon radical.

9. A stabilizer composition according to claim 8 in which the carbonate ester is an ester of 4,4'-n-butylidenebis(2-t-butyl-5-methylphenol).

10. A stabilizer composition according to claim 1 containing as an additional stabilizing ingredient at least one compound selected from the group consisting of Group II metal salts of monocarboxylic acids having 6 to 24 carbon atoms.

11. A stabilized synthetic resin composition comprising a synthetic resin selected from the group consisting of polymers of alpha-olefins having 2 to 4 carbon atoms, acrylonitrile-butadiene-styrene polymers, and terephthalic acid ester polymers, and 0.02 to 10% by weight of the resin of a stabilizer composition according to claim 1.

12. A stabilized synthetic resin composition according to claim 11 in which the synthetic resin is ethylene vinyl acetate copolymer.

13. A stabilized synthetic resin composition according to claim 11 in which the synthetic resin is acrylonitrile-butadiene-styrene polymer.

* * * * *

UNITED STATES PATENT AND TRADEMARK OFFICE
CERTIFICATE OF CORRECTION

PATENT NO. : 4,321,191

DATED : March 23, 1982

INVENTOR(S) : Motonobu Minagawa et al

It is certified that error appears in the above-identified patent and that said Letters Patent are hereby corrected as shown below:

Column 5, line 3 :  "disphenol" should be --bisphenol--

Column 8, line 39: "alcohl" should be -- alcohol--

Column 21, line 26 : "atomosphere" should be --atmosphere--

Column 23, Table 6
under Heading "melting point": "89-90°C." should be --86-90°C.--

Column 24, Table 8
under Heading POLYHYDRIC PHENOL(PHP) last line: "1, 1, 3-tris(2'-methyl-5'-t-" should be --1, 1, 3-tris(2'-methyl-5'-t-butyl-4'-hydroxy phenyl) butane --

Column 27, Table 12, No. 58

" 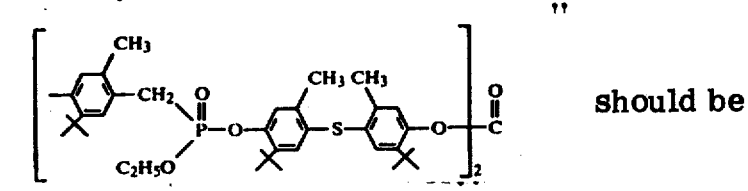 " should be

-- 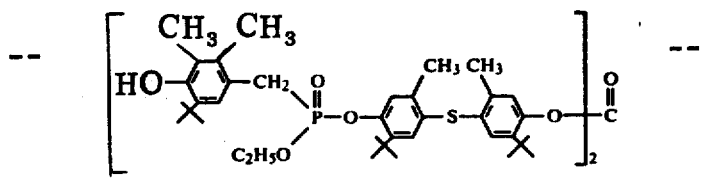 --

UNITED STATES PATENT AND TRADEMARK OFFICE
CERTIFICATE OF CORRECTION

PATENT NO. : 4,321,191                                              Page 2 of 3

DATED : March 23, 1982

INVENTOR(S) : Motonobu Minagawa et al

It is certified that error appears in the above-identified patent and that said Letters Patent are hereby corrected as shown below:

Column 33, Table 14 : "

TABLE 14

| No. | Caronate Compound | Thiodipropionate Compound | Deterioration Beginning Time HRS. |
|---|---|---|---|
| Control | | | |
| 2-1 | 4,4'-butylidene bis(2-t-butyl-5-methyl phenol) | No. S-3 | 385 |
| 2-2 | No 8 | dilaurylthiodipropionate | 427 |
| EXAMPLE | | | |
| 2-1 | No. 2 | No. S-6 | 552 |
| 2-2 | No. 8 | No. S-1 | 565 |
| 2-3 | No. 15 | No. S-9 | 556 |
| 2-4 | No. 20 | No. S-2 | 522 |
| 2-5 | No. 32 | No. S-11 | 513 |
| 2-6 | No. 35 | No. S-7 | 560 |
| 2-7 | No. 39 | No. S-10 | 558 |
| 2-8 | No. 50 | No. S-3 | 541 |
| 2-9 | No. 56 | No. S-12 | 508 |
| 2-10 | No. 62 | No. S-8 | 530 |

" should be

TABLE 14

| No. | Caronate Compound | Thiodipropionate Compound | Deterioration Beginning Time HRS. |
|---|---|---|---|
| Control | | | |
| 2-1 | 4,4'-butylidene bis(2-t-butyl-5-methyl phenol) | No. S-3 | 385 |
| 2-2 | No 8 | dilaurylthiodipropionate | 427 |
| EXAMPLE | | | |
| 2-1 | No. 2 | No. S-6 | 552 |
| 2-2 | No. 8 | No. S-1 | 565 |
| 2-3 | No. 15 | No. S-9 | 556 |
| 2-4 | No. 20 | No. S-2 | 522 |
| 2-5 | No. 32 | No. S-11 | 513 |
| 2-6 | No. 35 | No. S-7 | 560 |
| 2-7 | No. 39 | No. S-10 | 558 |
| 2-8 | No. 50 | No. S-3 | 541 |
| 2-9 | No. 56 | No. S-12 | 508 |
| 2-10 | No. 62 | No. S-8 | 530 |

UNITED STATES PATENT AND TRADEMARK OFFICE
CERTIFICATE OF CORRECTION

PATENT NO. : 4,321,191
DATED : March 23, 1982
INVENTOR(S) : Motonobu Minagawa et al It is certified that error appears in the above-identified patent and that said Letters Patent are hereby corrected as shown below:

Column 34, Table 16 under Heading No. : "14-9" should be --4-9--

Column 37, formula first line : " $(-\overset{O}{\underset{\|}{C}}CH_2CH_2SCH_2CH_2\overset{O}{\underset{\|}{C}}-)_r Q'$ " should be -- $(-\overset{O}{\underset{\|}{C}}CH_2CH_2SCH_2CH_2\overset{O}{\underset{\|}{C}}-O)_r Q'$ --

Signed and Sealed this

Twelfth Day of November 1985

[SEAL]

Attest:

DONALD J. QUIGG

Attesting Officer

Commissioner of Patents and Trademarks